United States Patent [19]

Dworak et al.

[11] 4,443,168

[45] Apr. 17, 1984

[54] GEAR MACHINE CENTERING ARRANGEMENT

[75] Inventors: Wilhelm Dworak, Stuttgart; Martin Fader, Schoemberg; Claus Jöns, Sachsenheim; Siegfried Mayer; Karl-Heinz Müller, both of Vaihingen; Manfred Rasper, Leonberg; Dietrich Schuldt, Stuttgart; Wolfgang Talmon, Oetisheim; Günter Wolff, Schwieberdingen, all of Fed. Rep. of Germany

[73] Assignee: Robert Bosch GmbH, Stuttgart, Fed. Rep. of Germany

[21] Appl. No.: 296,183

[22] Filed: Aug. 25, 1981

[30] Foreign Application Priority Data

Sep. 20, 1980 [DE] Fed. Rep. of Germany ....... 3035663

[51] Int. Cl.³ .................. F01C 1/18; F01C 21/10; F16B 19/02
[52] U.S. Cl. ................... 418/131; 418/206; 29/156.4 R; 29/464; 403/13
[58] Field of Search .............. 418/131, 132, 205, 206, 418/270; 403/13, 14; 29/156.4 R, 464

[56] References Cited

U.S. PATENT DOCUMENTS

| 3,270,680 | 9/1966 | Rich | 418/206 |
| 3,554,678 | 1/1971 | Jackoboice et al. | 418/206 |
| 3,584,986 | 6/1971 | Hansen et al. | 418/270 |
| 3,881,849 | 5/1975 | Commarmot et al. | 418/206 |
| 4,201,521 | 5/1980 | Carlson | 418/131 |

FOREIGN PATENT DOCUMENTS 717630 2/1942 Fed. Rep. of Germany ...... 418/206

Primary Examiner—John J. Vrablik
Attorney, Agent, or Firm—Michael J. Striker

[57] ABSTRACT

An arrangement for centering an end wall of a housing of a hydraulic gear machine, such as a pump or a motor, with respect to the open end of an internal chamber provided in a housing body forming the circumferential wall of the housing includes a plurality of pins which are received in a press-fitting manner in bores of the end wall and protrude beyond an end face of the end wall which faces and closes the open end of the chamber in the mounting position. The pins may have contact surfaces which are turned to the same diameter as the corresponding inner surface of the housing body which bounds the open end of the chamber, or they may exactly fit into the open end, or overlap slightly with the inner surface in which event some material displacement or deformation takes place during the assembly of the end wall with the housing body. The bores in the end wall may be equiangularly distributed along a circle centered on an axis coinciding with that of an opening for a drive shaft in the end wall and, in the mounting position, with that of a circular section of the inner surface at the open end. A cylindrical projection may be provided at the other end face of the end wall for clamping the end wall in a clamping arrangement of a material-removing machine during the material-removing operation for producing the contact surfaces of the pins.

7 Claims, 7 Drawing Figures

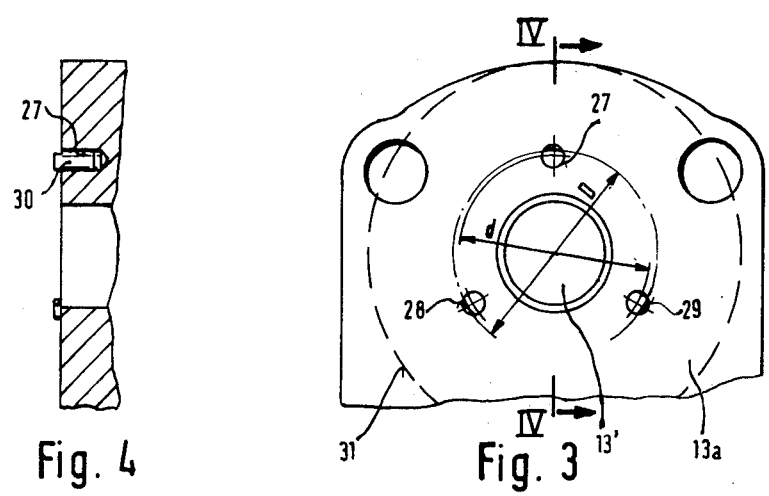
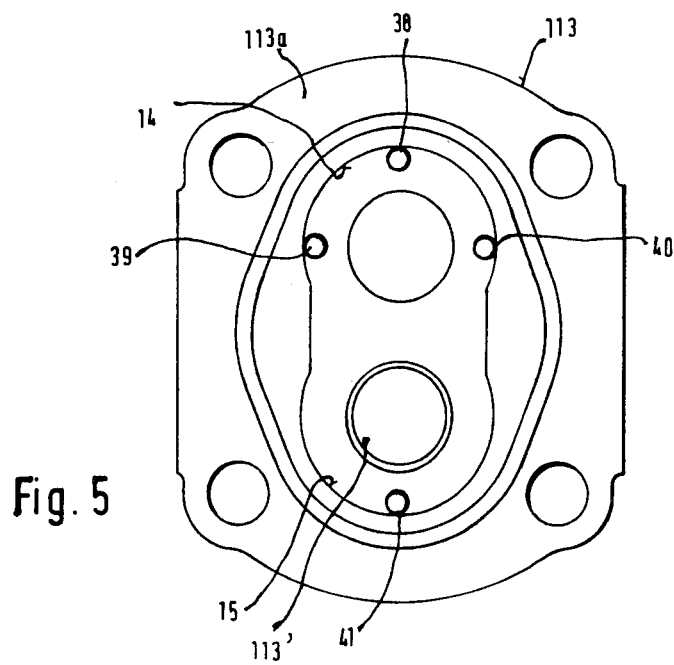

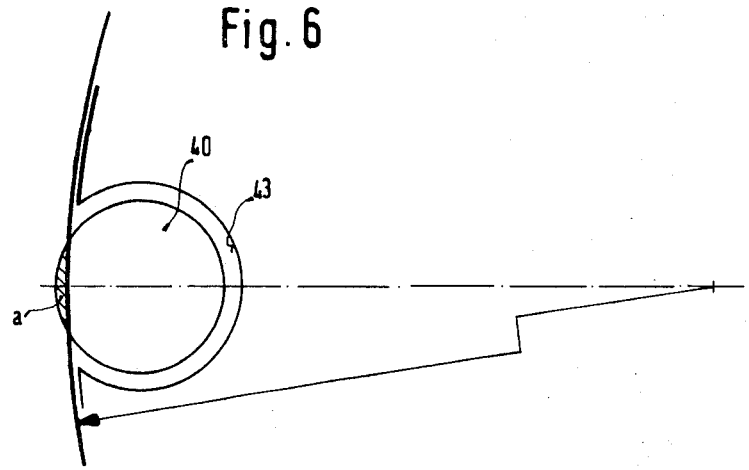
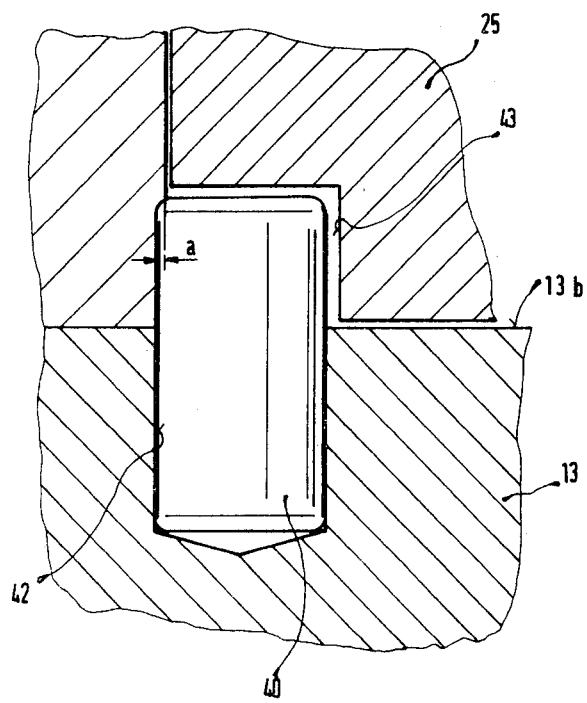

GEAR MACHINE CENTERING ARRANGEMENT

BACKGROUND OF THE INVENTION

The present invention relates to centering arrangements in general, and more particularly to a centering arrangement for centering an end wall with respect to a housing body of a hydraulic gear machine, such as a hydraulic gear pump or a hydraulic gear motor.

The basic construction of a hydraulic gear machine is so well known that it requires no detailed explanation herein. Suffice it to say that a hydraulic gear machine, which is usable either as a pump or as a motor, includes a housing body which bounds an internal chamber in which there are rotatably mounted meshing gears which define individual pressure compartments between the individual teeth at the meshing region; the housing body is open at least at one of its ends, and this end is closed by a plate-shaped end wall which may be provided with an opening for the passage of a drive shaft connected to one of the gears for joint rotation therewith between the internal chamber and the exterior of the housing constituted by the housing body and the end wall. The internal chamber is circumferentially bounded by an inner surface of the housing body.

When assembling the end wall with the housing body, it is necessary to accurately center the end wall with respect to the housing body, especially when the end wall is provided with the opening for the drive shaft. The conventional approach to this problem is to first align these two parts with one another in the required relative positions, to drill registering bores in these two parts while the same are being held in the aligned positions, and then to introduce fitting securing pins into these bores either prior to or during the assembly of the end wall with the housing body. This is a relatively expensive procedure, inasmuch as, as already mentioned before, the two parts must be first very exactly aligned with one another and the bores therein must exactly register with one another in the aligned or mounting position. The requirement for the exact pre-alignment has especially cost-raising consequences in the series production of the hydraulic gear machines.

SUMMARY OF THE INVENTION

Accordingly, it is a general object of the present invention to avoid the disadvantages of the prior art.

More particularly, it is an object of the invention to provide a centering arrangement for use in hydraulic gear machines which is not possessed of the disadvantages of the conventional centering arrangements of this type.

A further object of the present invention is to so design the centering arrangement of the type here under consideration as to avoid the need for pre-aligning the parts to be centered with respect to one another prior to the actual assembly thereof.

A concomitant object of the present invention is to devise a centering arrangement for the aforementioned use, which is simple in construction, easy to use, and inexpensive, and which provides for an exact centering nevertheless.

In pursuance of these objects and others which will become apparent hereafter, one feature of the present invention resides in a hydraulic gear machine which comprises, in combination, a hollow housing including a housing body having an inner surface bounding an internal chamber having at least one open end, and at least one end wall mounted on said housing body and having an end face which faces and closes the open end of the chamber in a mounting position of the end wall; meshing gear means in the chamber; and means for centering the end wall in the mounting position thereof relative to the housing body, including a plurality of pins extending from the end face of the end wall into the open end of the chamber and engaging the inner surface at the open end in the mounting position. The hydraulic gear machine further comprises drive means connected to the gear means and including a drive shaft. Then, the end wall may be provided with an opening for the passage of the drive shaft therethrough between the chamber and the exterior of the housing, and the centering means is operative for centering the opening in the end wall with respect to the drive shaft.

Advantageously, the pins are arranged along a circle which is centered on the axis of the aforementioned opening for the drive shaft. It is further advantageous in this connection to provide the pins with outer contact surfaces which are centered on the axis of the opening in the end wall and which are arranged at a diameter exactly corresponding to that of the inner surface of the housing member at the open end of the chamber. In this context, is is further advantageous to provide the end wall with a projection at its end face opposite to the aforementioned end face, this projection having a cylindrical outer surface which is centered on an axis coinciding with that of the inner surface of the housing body in the mounted position. This expedient greatly simplifies the production of the contact surfaces on the pins, in that the end wall can be simply clamped at the cylindrical surface of the projection in a clamping arrangement of a lathe or another material-removing machine, and the contact surfaces obtained during the material-removing operation of such a machine are automatically centered on the axis of the projection which, as mentioned before, coincides with the axis of the inner surface of the housing body in the mounting position. Also, the contact surfaces automatically obtain an arcuate shape coinciding with that of the inner surface of the housing body at the region of contact during the material-removing operation.

The pins are advantageously press-fitted into corresponding bores provided in said end wall at the end face thereof which faces the housing body in the mounting position. The inner surface of the housing body advantageously has at least a cylindrical section at the open end of the chamber, and then the plurality of pins may include at least three such pins which are distributed at regular intervals along a circle having a diameter slightly smaller than that of the cylindrical section of the inner surface.

According to an advantageous facet of the present invention, the pins are so distributed that their outer surfaces define an imaginary figure of slightly larger dimensions than the corresponding dimensions of the inner surface of the housing body at the open end of the chamber so that the pins fit into the open end during the assembling operation of the housing body with the end wall with attendant yielding or displacement of the material either of the housing body or of the pins themselves.

However, the pins can also be advantageously distributed at irregular intervals, especially if the regular distribution thereof would interfere with the operation of the hydraulic machine or would require redesigning the same. So, for instance, in an advantageous embodiment of the present invention, the pins are arranged at locations spaced across the open end of the chamber in the housing body from one another as considered in the mounting position.

A particular advantage obtained from the use of the above-enumerated expedients is that the pins can be easily secured to the end wall during the manufacture of the latter, in a time-saving manner, and yet they provide for accurate centering.

The novel features which are considered as characteristic of the invention are set forth in particular in the appended claims. The improved centering arrangement and the hydraulic machine embodying the same themselves, both as to their constructions and the mode of operation of the centering arrangement, together with additional features and advantages thereof, will be best understood upon persual of the following detailed description of certain specific embodiments with reference to the accompanying drawing.

BRIEF DESCRIPTION OF THE DRAWING

FIG. 3 is a front elevational view of a part of an end wall of the hydraulic gear machine of FIG. 1;

FIG. 4 is a sectional view taken on line IV—IV of FIG. 3;

FIG. 5 is a view similar to FIG. 2 but of a modified version of the centering arrangement;

FIG. 6 is an enlarged diagrammatic view illustrating the principle of interference fit in the centering arrangement; and FIG. 7 is an enlarged sectional view through a part of the centering arrangement of the present invention.

DETAILED DESCRIPTION OF THE PREFERRED EMBODIMENTS

Figure 1:
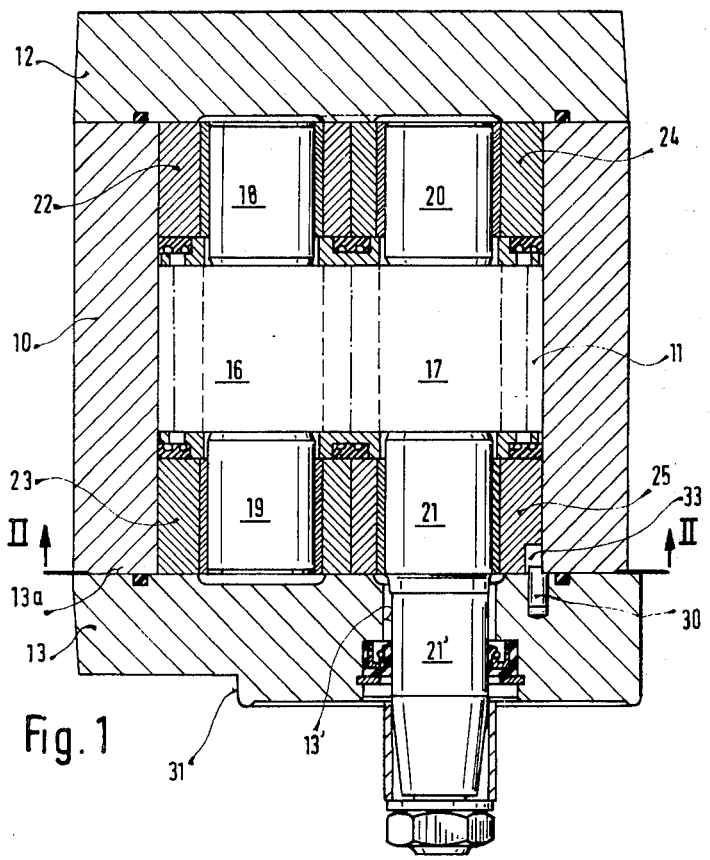
FIG. 1 is an axial sectional view of a hydraulic gear machine embodying a centering arrangement of the present invention.

Referring now to the drawing in detail, and first to FIG. 1 thereof, it may be seen that the reference numeral 10 has been used to identify a housing of a hydraulic gear machine, such as a hydraulic gear pump or motor, in its entirety. The housing 10 defines an internal bore or chamber 11 which is open at both of its ends. Two covers or end walls 12 and 13 are mounted on the housing 10 and respectively close the open ends of the internal chamber 11 of the housing body or housing 10. The internal chamber 11 is constituted by two intersecting substantially cylindrical bores 14 and 15, so that the composite cross section thereof resembles the numeral eight.

Two gear wheels 16 and 17 are arranged in the internal chamber 11 of the housing body 10, these gear wheels 16 and 17 meshing with one another at their outer peripheries and being mounted on respective stub shafts 18, 19, 20 and 21 for joint rotation therewith. The respective stub shafts 18, 19, 20 and 21 are respectively rotatably supported in sleeve-shaped bearing bodies 22, 23, 24 and 25. The stub shaft 21 has an extension 21' which extends through an opening 13' provided in the end wall 13 between the internal chamber 11 and the exterior of the housing 10, 12, 13. The extension 21' serves for driving the machine when the latter is being used as a pump, and for deriving power from the machine when the same is being employed as a motor.

It is important to realize that the end wall 13 must be exactly centered and fixed in position relative to the housing body 10 and the open end of the chamber 11 in its mounting position in which it closes the associated open end of the internal chamber 11. In accordance with the present invention, this centering and positional fixing is achieved by providing a plurality of blind bores 27, 28, and 29 at that end face 13a of the end wall which faces toward the open end of the chamber 11 in the mounting position of the end wall 13 relative to the housing body 10, and by accommodating a plurality of centering pins 30 in the respective bores 27, 28 and 29. The blind bores 27, 28 and 29 are distributed at regular intervals along a circle which is centered on the axis of the opening 13' and, in the mounting position, on the axis of the cylindrical bore 14 of the housing body 10, and which has a diameter d. Advantageously, the diameter d is slightly smaller than the diameter D of the bore 14. The centering pins 30 are introduced into the respectively associated blind bores 27, 28 and 29 after the end face 13a has been treated in a material-removing operation to give the same the desired surface quality. The pins 30 may be made of steel, aluminum or a similar material. The pins 30 are press-fitted into the individual blind bores 27, 28 and 29 in such a manner that the free end portions of the pins 30 protrude from the surface or end face 13a of the end wall 13 to the extent of several millimeters. Subsequently to the introduction of the pins 30 into the blind bores 27, 28 and 29, the pins 30 are provided with external contact surfaces in a material-removing operation, such as in a turning operation, in which material is removed from the outward portions of the protruding ends of the pins 30 until there are obtained the aforementioned contact surfaces which are centered on the axis of the opening 13' and are arranged at the diameter D which is the same as the inner diameter D of the bore 14. The correlation of the diameters d and D may be seen in FIG. 3, while the result of the material-removing operation can best be seen from the comparison of FIGS. 3 and 4.

To assure accuracy of the material-removing operation, the end wall 13 is provided with a cylindrical clamping projection 31 which is shown in cross section in FIG. 1 and in broken lines in FIG. 3. During the material-removing operation, the material-removing machine, such as a lathe, engages the projection 31 at its outer cylindrical surface by its clamping arrangement. The cylindrical surface of the projection 31 is exactly centered on the axis of the opening 13' of the end wall 13, and is provided at that end face of the end wall 13 which faces away from the housing body 10 in the mounting position.

Figure 2:
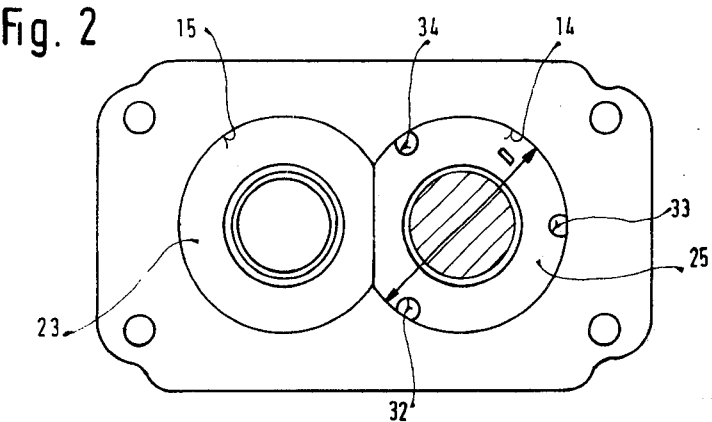
FIG. 2 is a cross-sectional view taken on line II—II of FIG. 1.

Now, it is merely necessary to provide recesses or bores 32, 33 and 34, the number and distribution of which corresponds to those of the pins 30, in the bearing body 25, as shown in FIG. 2, these recesses serving for receiving the respective pins 30 in the mounting position of the end wall 13 relative to the housing body 10. It is to be noted that the recesses 32, 33 and 34 have nothing to do with the centering of the end wall 13 with respect to the housing body 10. The centering effect is accomplished solely by the coincidence of the diameter D at the contact surfaces of the pins 30 and at the internal surface of the housing body 10 bounding the bore 14 of the chamber 11. This means that the recesses 32, 33 and 34 can have a slightly larger diameter than the positioning or centering pins 30. After the end wall 13 has been centered with respect to the housing body 10, it is connected to the housing body 10 in its properly centered mounting position in any conventional manner, such as by screws or bolts.

Of course, it is also possible to so accurately position the blind bores 27, 28 and 29 for the pins 30 that the latter need not be treated in any material-removing operation but rather that the outermost generatrices of the pins 30 are so arranged that the pins 30 fittingly enter the bore 14 of the housing body 10, that is, without any play or with only minimum play or interference.

FIGS. 5 to 7 illustrate a modified construction of the centering arrangement of the present invention. As may best be seen in FIG. 5, it is not necessary to arrange all of the positioning or centering pins on the same circle concentric to the opening 113′ of the end wall 113. In this construction, there are provided four centering pins 38, 39, 40 and 41 which are mounted at the end face 113a of the end wall 113 in the same manner as discussed above in connection with the pins 30. The pins 38, 39, 40 and 41 are, in this instance, fittingly received in bores 42 which are arranged at diametrically opposite locations of the end wall 113 as considered with respect to the substantially eight-shaped cross section of the internal chamber 11 consisting of the bores 14 and 15. Here again, the free ends of the pins 38, 39, 40 and 41 protrude to the extent of several millimeters beyond the end face 113a of the end wall 113. The blind bores 42 are so situated that, in the mounting position or immediately prior to the introduction into the open end of the chamber 11, the outer regions of the pins 38, 39, 40 and 41 extend slightly beyond the contour of the open end of the chamber 11. This may best be seen in FIGS. 6 and 7, where the degree of overlap is indicated by the reference character a. As in the above-discussed example, recesses or bores 43 are again provided in the bearing bodies 23 and 25, into which the pins 38, 39, 40 and 41 are respectively introduced during the assembly of the end wall 113 with the housing body 10. During the assembling operation, the material of the housing body 10 which stands in the way of the overlapping region a is displaced if the material of the housing body 10 is softer than that of the respective pin 38, 39, 40 or 41. On the other hand, it is the material of the pins 38, 39, 40 or 41 which is being displaced, or the pins 38, 39, 40 and 41 are otherwise inwardly deformed to the extent of the overlap a in the event that their material is softer than that of the housing body 10. Of course, such a displacement or deformation need not occur when the blind bores 42 are so accurately positioned that there is no interference or overlap. In any event, it is not necessary to subject the pins 38, 39, 40 and 41 to any material-removing treatment.

The last-discussed construction is particularly suited for use in hydraulic gear machines in which the pressurized hydraulic medium is admitted into or discharged from the chamber 11 through the end wall 113. Under there circumstances, the pins 30 distributed as shown in FIGS. 1 to 4 would interfere with the admission or discharge ports.

It will be understood that each of the elements described above, or two or more together, may also find a useful application in other types of arrangements or devices differing from the type described above.

While the invention has been described and illustrated as embodied in a hydraulic gear machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a hydraulic gear machine, a combination comprising a hollow housing including a housing body having an inner surface bounding an internal chamber having at least one open end, and at least one end wall mounted on said housing body and having an end face which faces and closes said open end of said chamber in a mounting position of said end wall; meshing gear means in said chamber; and means for centering said end wall in said mounting position thereof relative to said housing body, including at least four pins extending from said end face of said end wall into said open end of said chamber and engaging said inner surface at said open end in said mounting position, said four pins being so distributed that their outer surfaces define an imaginary figure of slightly larger dimensions than those of said inner surface of said housing body at said open end of said chamber so that said pins are fitted into said open end on assembly of said end wall with said housing body with attendant material displacement.

2. The combination as defined in claim 1; further comprising drive means connected to said gear means and including a drive shaft; and wherein said end wall has an opening for the passage of said drive shaft therethrough between said chamber and the exterior of said housing, said centering means being operative to center said opening with respect to said drive shaft.

3. The combination as defined in claim 1, wherein said end wall has a plurality of blind bores at said end face; and wherein said pins are press-fitted into said bores.

4. The combination as defined in claim 1, wherein said end wall has another end face facing oppositely to said end face, and a projection at said other end face having a cylindrical circumferential surface for clamping said end wall during a material-removing operation.

5. The combination as defined in claim 1, wherein said inner surface of said housing body has at least a cylindrical section at said open end of said chamber; and wherein three of said pins are distributed at regular intervals along a circle having a diameter slightly smaller than that of said cylindrical section of said inner surface.

6. The combination as defined in claim 1, wherein said pins are distributed at irregular intervals.

7. The combination as defined in claim 1, wherein said pins are arranged at locations spaced across said open end of said chamber in said housing body from one another in said mounting position.

* * * * *